July 3, 1956

W. KNAPP 2,752,959

MULTIPLE POSITION WOODWORKING MACHINE

Filed Feb. 12, 1952

INVENTOR
Walter Knapp.
BY
ATTORNEYS.

July 3, 1956
W. KNAPP
2,752,959
MULTIPLE POSITION WOODWORKING MACHINE
Filed Feb. 12, 1952
7 Sheets-Sheet 2
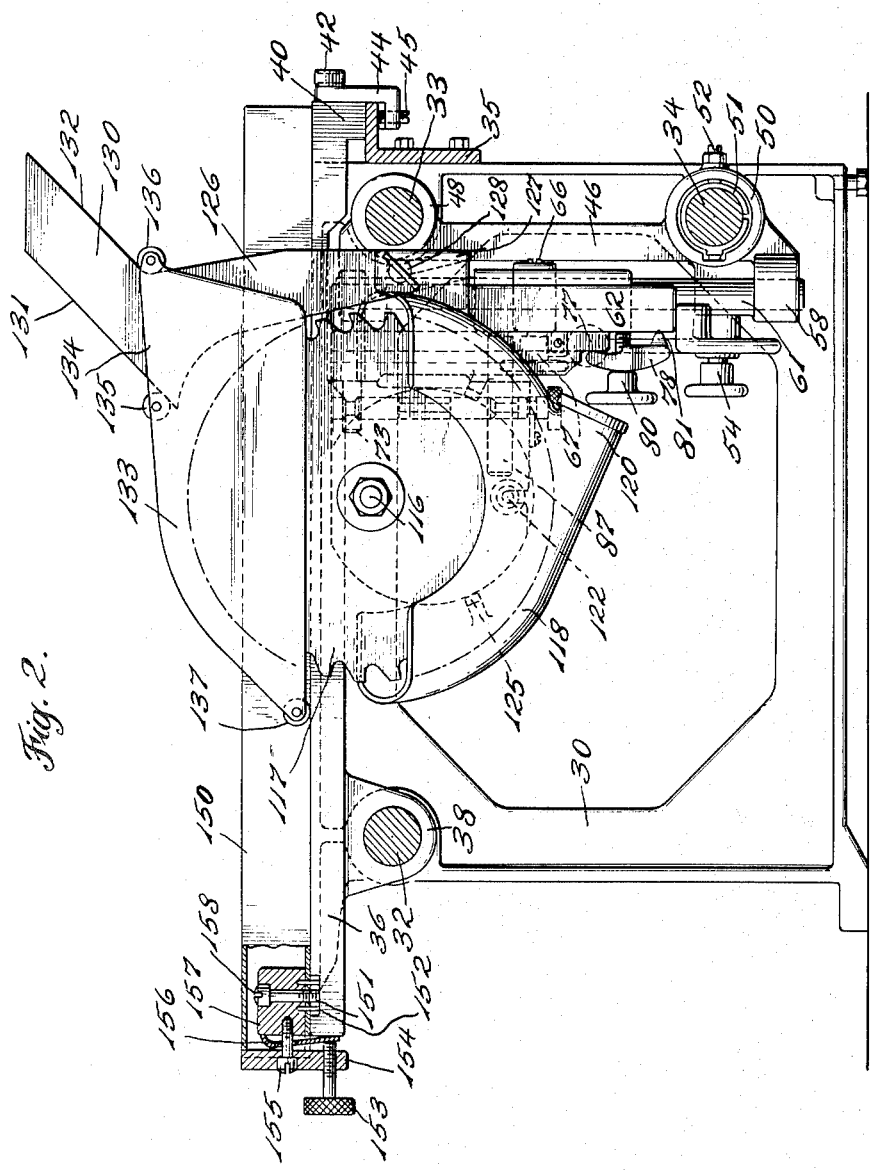
Fig. 2.
INVENTOR
Walter Knapp.
BY
ATTORNEYS July 3, 1956 W. KNAPP 2,752,959
MULTIPLE POSITION WOODWORKING MACHINE
Filed Feb. 12, 1952 7 Sheets-Sheet 3
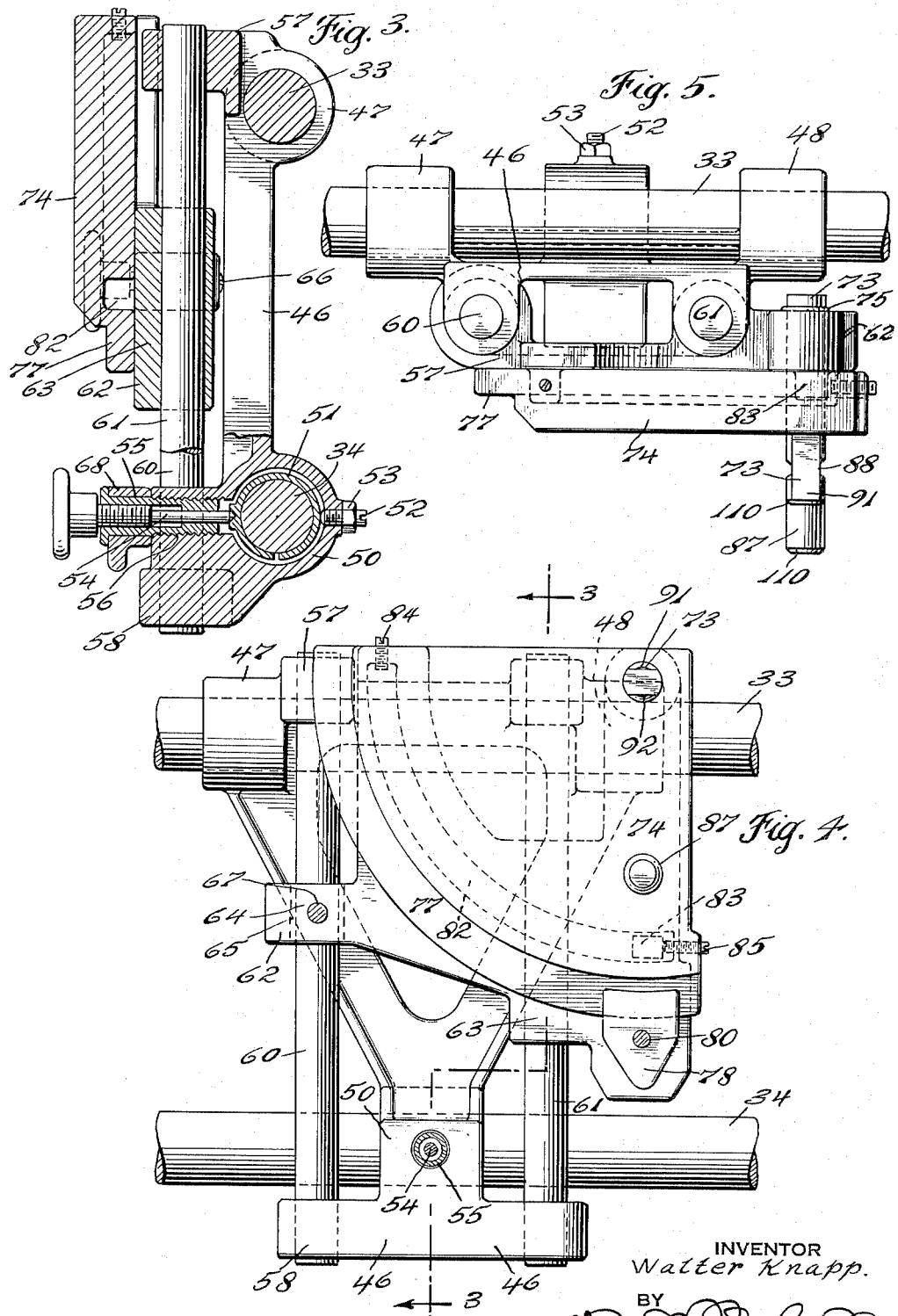
INVENTOR
Walter Knapp.
BY
ATTORNEYS.

July 3, 1956  W. KNAPP  2,752,959
MULTIPLE POSITION WOODWORKING MACHINE
Filed Feb. 12, 1952  7 Sheets-Sheet 4
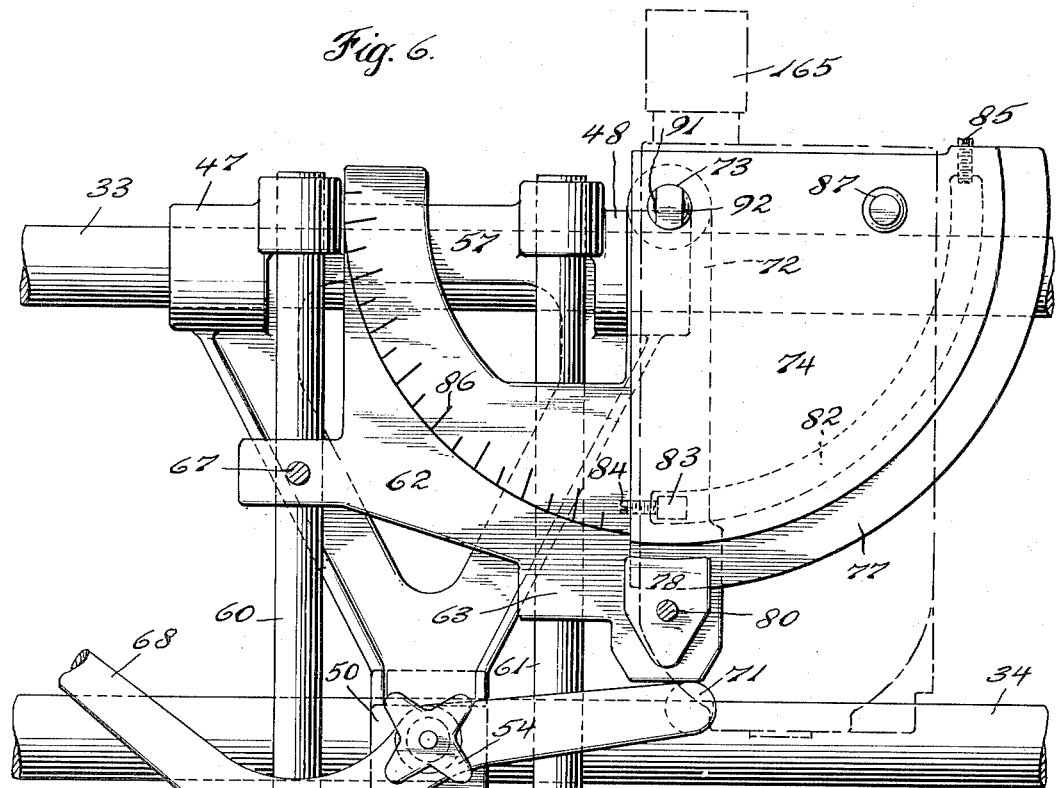
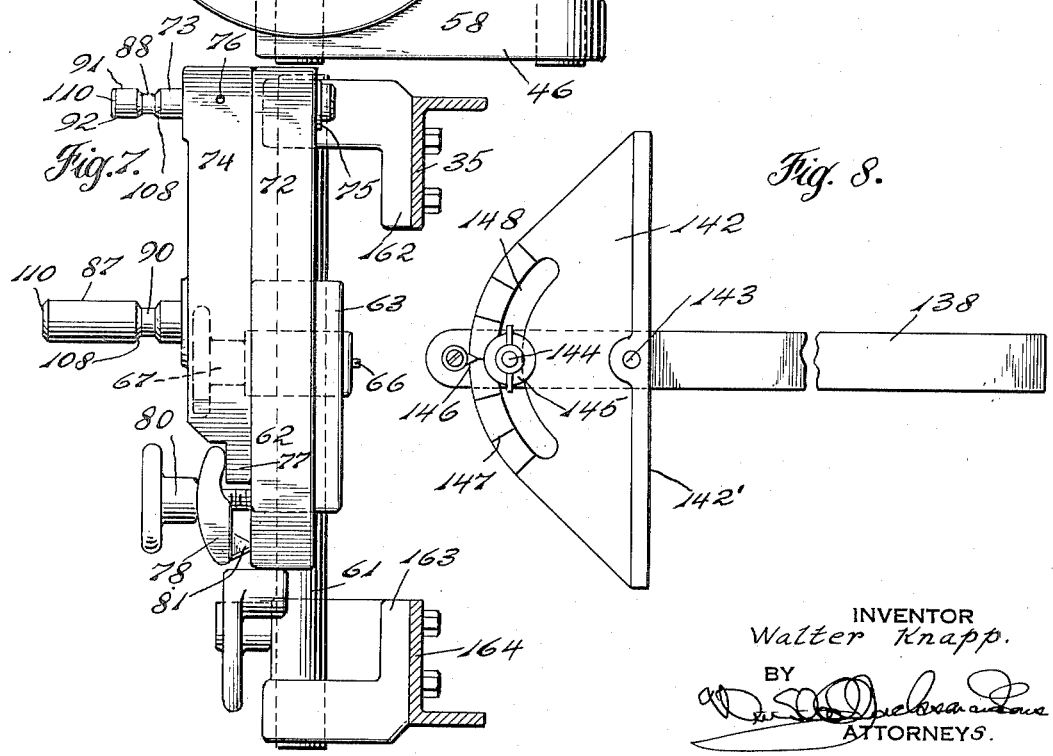
INVENTOR
Walter Knapp.
BY
ATTORNEYS.

July 3, 1956 W. KNAPP 2,752,959
MULTIPLE POSITION WOODWORKING MACHINE
Filed Feb. 12, 1952 7 Sheets-Sheet 5

INVENTOR
Walter Knapp.
BY
ATTORNEYS.

July 3, 1956  W. KNAPP  2,752,959
MULTIPLE POSITION WOODWORKING MACHINE
Filed Feb. 12, 1952  7 Sheets-Sheet 6
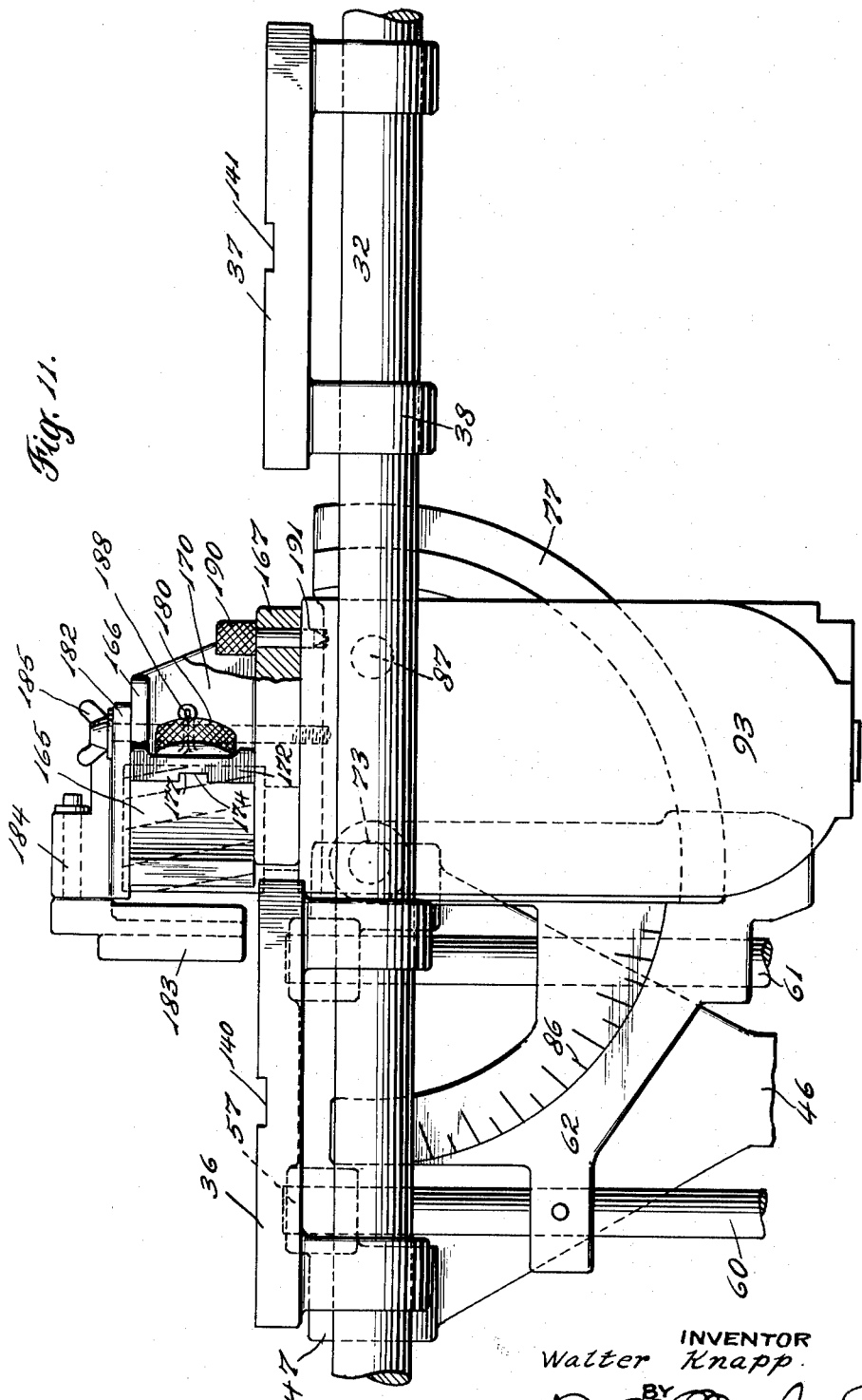

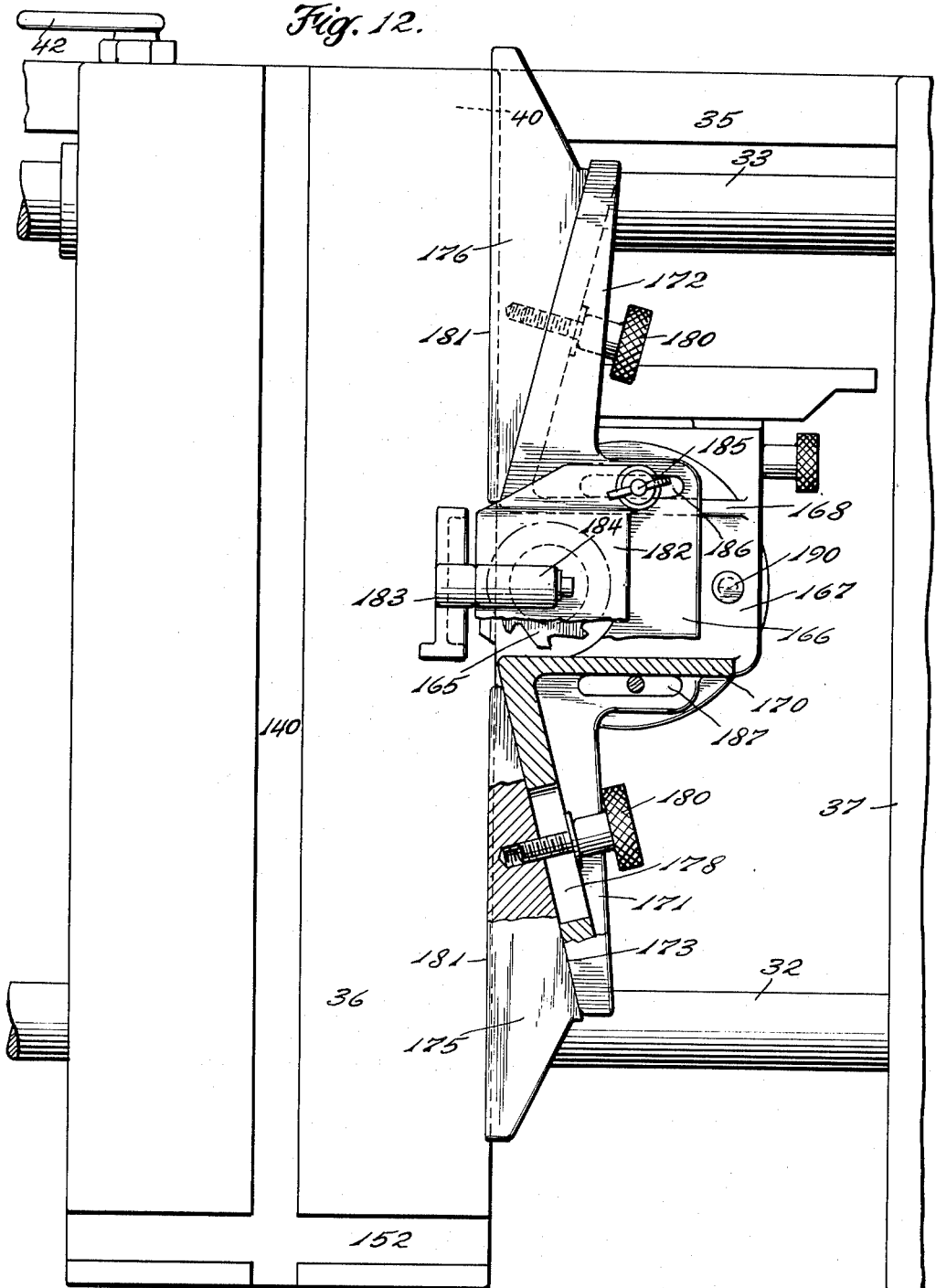

United States Patent Office
2,752,959
Patented July 3, 1956

2,752,959
MULTIPLE POSITION WOODWORKING MACHINE

Walter Knapp, Manheim Township, Lancaster County, Pa., assignor to Reamstown Products Company, Reamstown, Pa., a corporation of Pennsylvania Application February 12, 1952, Serial No. 271,195

12 Claims. (Cl. 143—35)

The present invention relates to machine tools especially to the character employed for working wood, fibre, plastics and the like.

A purpose of the invention is to provide ready adjustment of the tool position, both as to depth of cut and angle, without sacrificing simplicity and safety.

A further purpose is to improve the flexibility of machine tools, especially those of the wood working type, positioning the motor on various mountings, with great reliability and utilization of a variety of cutting tools operated by the same motor.

A further purpose is to mount the motor preferably by quickly adjustable means on a segment which swings with respect to an elevator and is clamped into a selective position.

A further purpose is to employ the pivot pin of the segment as one of a pair of quickly adjustable engaging pins for the motor.

A further purpose is to inter-relate an abutment on the elevator with an adjustment slot on the segment, and to limit the angle of adjustment by adjustable stops on the segment engaging the sides of the abutment.

A further purpose is to guide the elevator on spaced suitably vertical guide rods.

A further purpose is to provide widely spaced guiding bearing engagement between the elevator and one of the guide rods, and on the other guide rod to place a short bearing intermediate between the limits of the guide bearings on the one guide rod.

A further purpose is to adjust the position of the short bearing to align the elevator.

A further purpose is to clamp the elevator by engagement adjoining the short bearing.

A further purpose is to manipulate the elevator by a lever pivoted intermediate its ends, and which at one end engages the elevator.

A further purpose is to mount the guide rods on a carriage, and move the carriage laterally on rails, clamping the carriage at a selected position.

A further purpose is to provide spaced bearing supports for the carriage on one of the rails, and a short bearing support for the carriage on the other rail at a point intermediate the spaced bearing supports.

A further purpose is to clamp the carriage to the rails by clamping means acting at the short bearing.

A further purpose is to adjust the carriage with respect to the clamp at the short bearing for vertical alignment.

A further purpose is to provide a separate work-supporting table independently movable on rails or the like, and capable of being clamped in any desired position.

A further purpose is to adjust with respect to a stop by providing a fixed stop on the bed or frame, and moving the tool and desirably the tables laterally to agree with the stop position.

A further purpose is to support a lower guard directly on the motor around the saw or other tool, and permissibly use the lower guard also as a dust chute.

A further purpose is to mount a splitter removably in the line of the saw or other tool, as from the motor, and provide an upper guard which is supported by and moves along the splitter suitably on a diagonal guide portion of the splitter.

A further purpose is to inter-relate the work guides to the work guide support by a tongue and channel.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figure 2 is a section of Figure 1 on the line 2—2, the rip fence being shown on the opposite side of the saw from the position of Figure 1, and being partially broken away to illustrate the attachment means.

Figure 3 is an enlarged section through the rails and carriage, the section being taken on the line 3—3 of Figure 4.

Figure 4 is a fragmentary elevation of the carriage elevator and quadrant, the rails being broken away.

Figure 5 is a fragmentary top plan view of the carriage elevator and quadrant.

Figure 6 is an enlarged view showing the quadrant swung around for supporting a cutter on a vertical axis, such as a shaper or joiner, the motor, arbor and tool being shown in phantom.

Figure 7 is a modification of the structure of Figures 1 to 6, showing the guide rods supported fixedly from beams.

Figure 8 is a fragmentary planned view of the mitre gauge.

Figure 11 is a fragmentary front elevation of a joiner to which the invention has been applied.

Figure 12 is a fragmentary plan view of the joiner of Figure 11.

Figure 1:
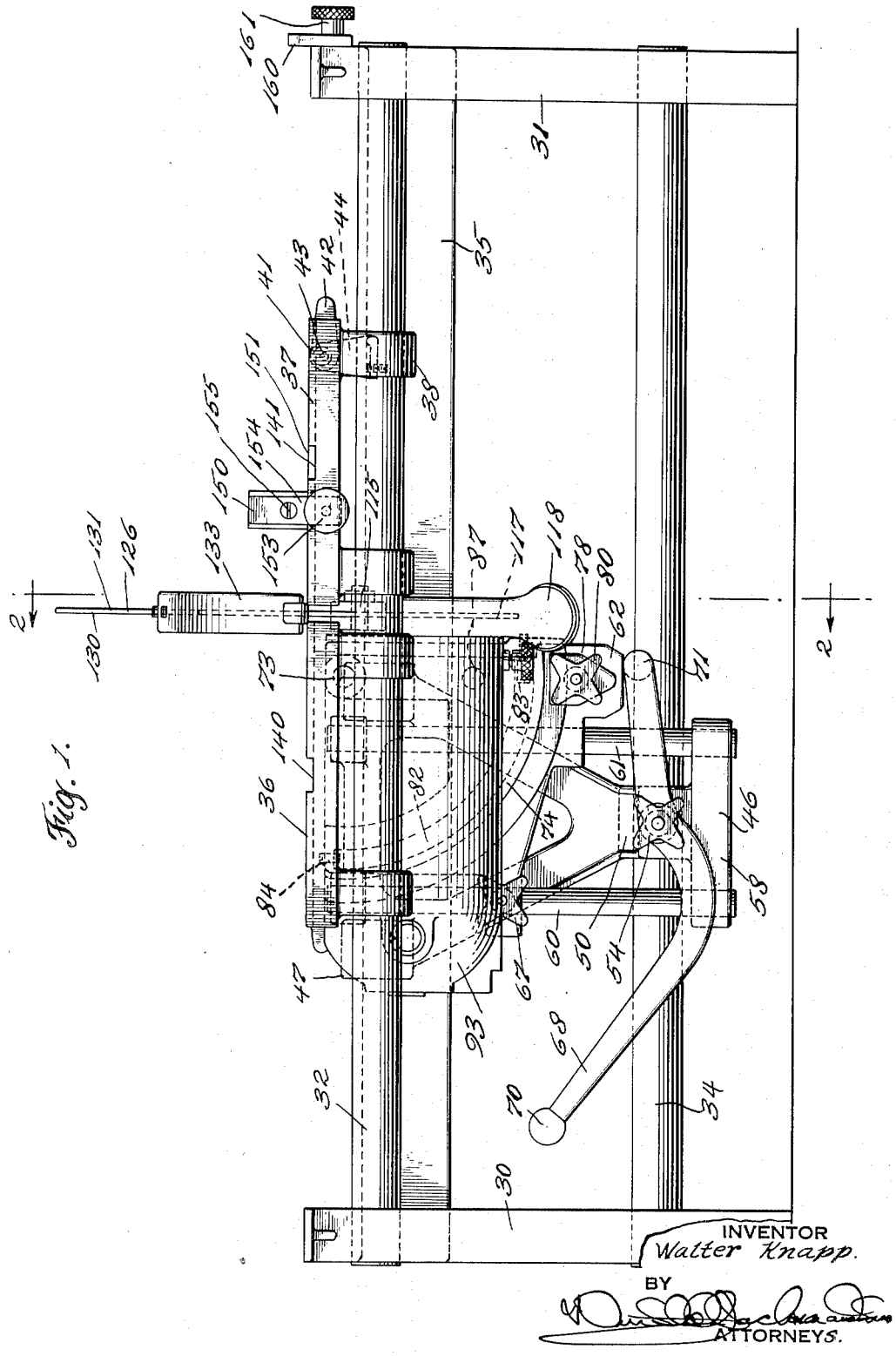
Figure 1 is a front elevation of a circular saw to which the principles of the invention have been applied.

Describing in illustration but not in limitation and referring to the drawings:

In tools of the character used in construction operations, home shops and industrial plants, especially for working wood, fibre, plastics, light metals, and other similar materials, it is very desirable to be able to provide a series of alternate tools such as a circular saw, joiner, shaper, and the like, operated by the same motor and using other common components.

In accordance with the present invention, the motor is quickly detachable from the supporting means, and can very readily be applied to other tools including hand tools. While the motor is quickly detachable, no sacrifice has been made from the standpoint of safety and reliability.

It is highly important in tools of this character to be able to adjust the tool to the work guiding surfaces readily so that a set-up can be made to perform a new fabricating operation without delay. In the present invention, the device is very quickly adjustable both as to tool angle and position and also as to work guiding surfaces, and such adjustment does not require expert personnel.

The device is very efficient from the standpoint of speed and accuracy in cutting, and therefore is capable of use not only in home shops, but also in production work.

The quickly detachable feature is embodied in my U. S. application Serial No. 240,743, filed August 7, 1951, for Tool Holder Clamp.

This application has been divided, and the subject matter relating to a joiner and the like is embodied in U. S. patent application Serial No. 433,641, filed June 1, 1954, for Multiple Position Working Machine.

Considering first the illustration of a circular saw shown in Figures 1 to 5 inclusive, and the shaper or the like of Figure 6, end frames 30 and 31 support rails 32, 33 and 34 and a beam 35 running lengthwise. Tables 36 and 37 are guided by sliding guides 38 surrounding rail 32 and by feet 40 resting on beam 35 (Figure 2). The tables are movable independently of one another and may be locked in any particular position by rotating eccentric 41 (Figure 1) which is an integral part of lever 42 (Figure 2). The eccentric 41 is pivotally supported on stud 43 which is screwed into the table. Rotation of the eccentric raises clamp shoe 44 which grips beam 35. The position of lever 42 at which the table is effectively clamped is controlled by set screw 45. The clamps on the two tables are suitably arranged to operate in opposite directions.

A carriage 46 is transversely movable along rails 33 and 34. The upper portion of the carriage is spread to form spaced sliding bearings 47 and 48 (Figures 4 and 5) which surround rail 33. The lower central portion of the carriage has a bearing housing 50 which surrounds the lower rail 34 and contains a split bearing 51, best seen in Figures 2 and 3. The split bearing 51 is suitably a sleeve open at one side and held at the outside between a set screw 52 in the bearing housing 50 held in adjusted position by lock nut 53 and clamping screw 54 threaded in an opening through pivot 55 which is threaded at 56 into the carriage. By adjusting set screw 52 the entire carriage may be rotated about rail 33 sufficiently to square up the carriage vertically.

The carriage 46 is provided with arms 57 and 58 respectively located at the top and bottom which support suitably vertical guide rods 60 and 61. The guide rods support and guide the vertical movement of an elevator slide 62. The elevator slide has a construction similar to the carriage. The elevator slide as seen in Figures 3, 4, 6 and 7 is spread to give long bearing engagement and widely spaced bearing engagement 63 on guide rod 61, while at 64 on guide rod 60 it has short bearing engagement at a point intermediate between upper and lower bearing engagement at 63. The bearing 64 has a split sleeve 65 (Figure 4) which is free in the bearing housing similar to the construction of the bearing housing 50, and the split bearing sleeve 65 is held between set screw 66 (Figure 3) at one end and clamping screw 67 at the other end. The clamping screw is threaded through an opening in the elevator bearing housing. Thus by adjusting the position of the split bearing sleeve in the bearing housing through adjusting set screw 66 the elevator can be aligned with the rails.

Normally the weight of the elevator slide will cause it to descend by gravity when the clamping screw 67 is released. To control the downward movement of the elevator slide, as well as to elevate the elevator slide to operating position, a lever 68 (Figs. 1 and 6) is provided pivoted around pivot 55 intermediate within its ends, having a handle 70 and having a rounded opposite end 71 engaging the bottom of the elevator slide and adapted to urge the elevator slide upward when pressure of the hand is applied to the handle 70.

It will be evident that any suitable means may be employed for supporting the elevator at any selected height, and I do not deem it critical whether this be done as shown, or by clamping lever 68, or by providing screw means on one of the guide rods or separate therefrom.

Projecting vertically from the elevator slide 62, an arm 72 (Figures 6 and 7) is provided which supports horizontal pivot 73. Pivot 73 is secured to a quadrant 74 pivoting on pivot 73, and extends through a pivotal opening in the elevator slide and is locked at the back of the elevator slide against unintentional removal by snap ring 75 (Figure 5) which fits in an annular recess of pivot 73. The pivot is suitably secured to the quadrant as by pin 76 (Figure 7).

The quadrant is flanged at 77 to form an arcuate rim which is engaged by clamp 78 which is gripped by clamp screw 80 (Figures 1, 2, 4 and 6) to hold the quadrant in any desired limiting position. Clamp 78 conveniently has a fulcrum 81 which engages the elevator at one end, and at the opposite end it extends over the flange at the quadrant. The clamp screw is threaded into the elevator slide.

On the inner side the quadrant has a segmental groove 82 into which extends an abutment lug 83 suitably integral with the elevator slide. Set screws 84 and 85 extend into the ends of the groove 82 and by adjustment permit correct positioning of stops on the positions of the quadrant. The adjustment of the set screws 84 and 85 permits lining up a saw or other tool with respect to the work table.

The elevator slide suitably carries a scale 86 (Figure 6). The scale 86 lines up with one edge of the quadrant to act as an index.

The quadrant carries a quickly detachable mounting for the tool motor. Pivot 73 as already described is extended out beyond the quadrant to receive the motor, thus acting as a post, and a cooperating post 87 extends out from the quadrant parallel to and in the same direction as post 73 suitably from a point well spaced from pivot 73. Post 73 has intermediate its ends and conveniently located at the sides grooves 88 for receiving a clamping dog and, conveniently at the same distance from the quadrant, post 87 has at its sides grooves 90 for receiving another clamping dog. Post 87 extends out considerably further than post 73 as shown in Figure 7 in the preferred embodiment so that only one opening must be engaged on the post at a time. Also to facilitate the insertion and avoid difficulty through slight angular differences between the motor recesses and the posts, post 73 is flattened on the side farthest from post 87 at 91 and on the side nearest post 87 at 92 (see also Figures 4 and 6). The tool motor 93 is provided at one side with recesses 94 and 95 (Figure 10) in the motor housing having the same center distance as posts 73 and 87, accurately parallel to one another and transverse to face pads 96 at the side of the motor, which are to engage against the quadrant. Thus the posts accurately fit in the recesses 94 and 95.

A transverse bore 97 (Figure 10) extends through the motor housing immediately at one side of recesses 94 and 95 and contains opposed dogs 98 having suitably annular tapered noses 100. The dogs are oppositely threaded (right and left hand) respectively on oppositely threaded clamping shaft 101 which is provided with collar 102 at one end fitting in the bore, held from movement of the shaft axially by lug 103 secured to the motor housing by screw 104 and engaging between collar 102 and the hub of clamp knob 105. The dogs 98 are prevented from turning as they clamp and unclamp by pins 106 riding in slot 107 in the side of bore 97.

The grooves 88 and 90 in posts 73 and 87 have suitable forward and backward beveled portions 108 which receive the beveled forward portions of the dogs, permitting the dogs to pull the motor down into firm engagement with the quadrant so that pads 96 rest against the surface of the quadrant and the motor is firmly held in place.

Thus by turning knob 105 in one direction the clamping dogs engage the grooves in the posts and clamp the motor, and by turning in the reverse direction the clamping is released.

The ends of posts 73 and 87 are suitably beveled at 110 to aid entry of the posts into the recesses of the motor housing.

The motor is desirably provided with a fan 111 (Figure 9) to circulate air, and has an armature shaft 112 turning on bearings 113 (the bearings at only one end are shown) which interconnects by speed change gearing 114 with a tool arbor 115 turning in bearings 116. The arbor may mount any one of a variety of tools, of which a circular saw 117 is typical and appears in a number of the figures. The rotating tools may be supported in many ways, but preferably the arbor is an integral part of a shaft traveling on precision ball bearings in the motor housing. The prescribed arbor speed is obtained by the suitable choice of speed change gearing. The speed change gears are preferably of helix type to secure smooth turning and minimum noise. The helix angle is so chosen that the gear thrust is on the inner arbor bearing, which relieves the front bearing of the load except the tool load. A generous cavity is provided in the gear case for lubrication.

Figure 9:
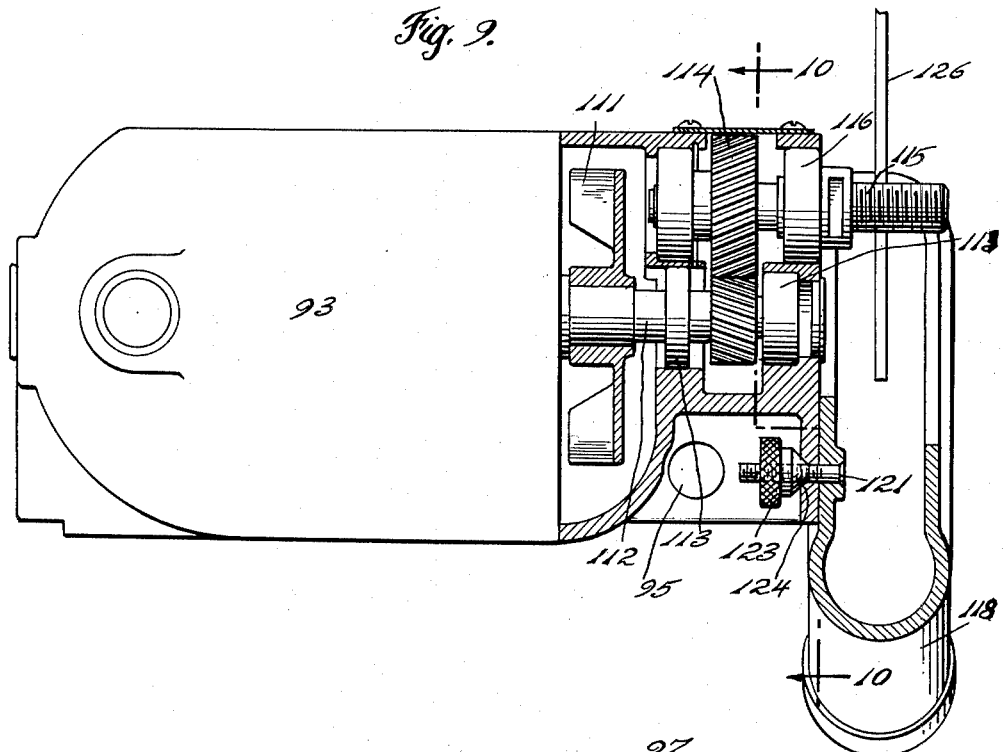
Figure 9 is a side elevation of the motor, with the gearing, fan and lower guard shown in section.
Figure 10:
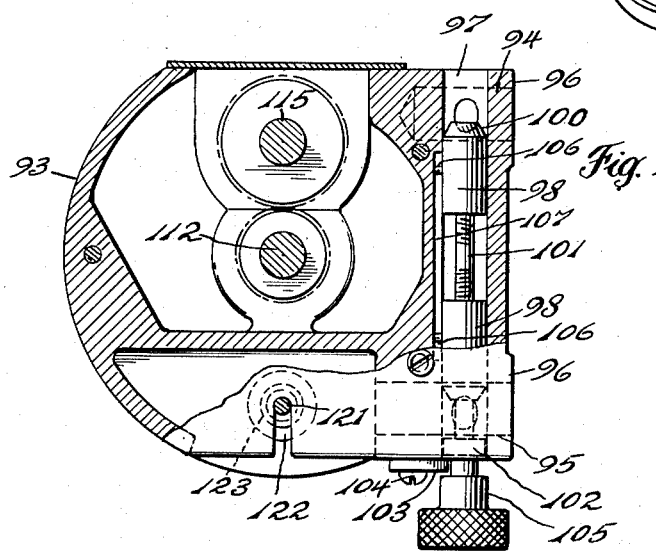
Figure 10 is a section of Figure 9 on the line 10—10.

Guards or the like can conveniently be attached directly to the motor housing. Lower guard 118 (Figures 1, 2 and 9) suitably surrounds the lower portion of the saw and serves as a dust collector and discharging means blowing out the dust through tangential nozzle 120 at the lower end. As best seen in Figures 9 and 10, the lower guard is anchored by stud 121 extending from the back of the guard through slot 122 in the end of the motor. Stud 121 carries nut 123 which has a beveled portion engaging in countersunk recess 124 at the upper end of the slot to hold the guard. The guard also has lugs 125 which engage against the housing of the motor to position the guard (Figure 2).

At the rear the lower guard 118 is slit in line with the saw to receive splitter 126 which has a slot 127 to receive thumb nut 128 to secure the two halves of the lower guard together and grip them about the splitter. The splitter extends up and has a rearwardly and upwardly extending portion 130 having front and back parallel tracks 131 and 132. Top guard 133 is slit at 134 at the rear upper end to extend around and follow the upwardly extending portion 130 of the splitter, and has on the top guard a pivoted roller 135 engaging track 131 and a pivoted roller 136 engaging track 132 so that the top guard rolls on the tracks on the splitter when the work displaces it upward or gravity allows it to lower. A pivoted roller 137 at the lower forward end of the top guard is also provided to ride on the top of the work. Front roller 137 reduces the pressure required to raise the top guard when it engages the forward vertical face of material entering the saw.

The table provides work guiding means. For cross cut sawing, the guide shown in Figure 8 is used. This consists of a tongue 138 which fits in groove 140 of table 36 (Figure 1) or groove 141 of table 37 for free sliding movement from front to rear. The guide head 142 is mounted on tongue 138 to pivot about pin 143 and is clamped to tongue 138 by stud 144 carrying wing nut 145. Head 142 has a guiding flat 142'. The angular position is indicated by index 146 on the tongue cooperating with scale 147 on the angle plate following the groove 148 in the angle plate through which the stud passes. Briefly this guide is composed of a bar, a head having a guide bar surface, pivotally connected to the bar near the end of the bar, an arcuate portion on the head at the end remote from the guiding flat surface, and a clamp cooperating between the head and the bar on the arcuate portion of the head to set the head in a predetermined arcuate position.

For rip sawing a guide is shown in Figures 1 and 2. A rip fence 150 is rigidly secured to transverse tongue 151 which slides in transverse groove 152 of the tables. The fence is clamped in any desired position by tightening thumb screw 153 which is threaded through front plate 154 of the rip fence. Screw 155 which secures plate 154 also secures shoe 156 which bridges grooves 140 and 141 and eliminates any tendency for the guide to catch. Screw 155 is threaded into block 157 which is secured to tongue 151 by screw 158 and suitable pins.

The rip fence 150 is supplemented by guide bar 160 secured to end frame 31 by thumb screw 161. Optional guide bar 160 may be secured to end frame 30 by moving the thumb screw to the other end frame. Guide bar 160 can be rotated 180° and clamped in a position below the top of the end frames when it is desired to have it out of the way. Either the rip fence or the guide bar may be used as a length gauge in connection with work guided by the cross cut gauge of Figure 8.

In some cases it may not be necessary to move the carriage along the rails, and in this case the elevator and quadrant may be supported as shown in Figure 7. In this form the guide rods 60 and 61 are supported from brackets 162 and 163 respectively connected to beam 35 at the top and beam 164 at the bottom. This produces a simplified machine for use where it is not necessary to manipulate the carriage.

In operation of the saw, the motor is removed from any particular tool to which it is attached, by relaxing the clamping dogs, and applying the motor to the clamping posts on the quadrant and then tightening the clamping dogs. The saw is then attached to the arbor. The work tables, carriage, elevator and quadrant are then adjusted to arranged the saw in a desired position and angle and the clamps are tightened to hold the work tables, carriage, elevator and quadrant in the proper positions. If the carriage or elevator is not properly aligned, this is achieved by adjusting the proper set screws after loosening the corresponding clamping screws and then retightening the clamping screws. If the quadrant stops are not properly adjusted this is accomplished by adjusting the proper set screws at the ends of the quadrant groove.

The appropriate work guides are then placed in position, after which the shop saw can be used in the usual way.

When it is desired to modify the angle or position of the saw, this can readily be done by modifying the work tables, and adjusting the quadrant, elevator slide and/or carriage to the extent desired.

In some cases it is desirable to perform shaper, joiner, milling and other similar functions. In Figure 6 the quadrant has been shown in position to place the arbor vertically to hold a shaper or similar rotary cutting tool 165. For convenience in description, the tool is called a shaper tool whether it is a joiner, milling cutter, or other similar tool.

Figures 11 and 12 show a shaper, joiner or similar device applicable to the machine of Figures 1 to 10 by removing the saw from the arbor, and comprising generally a frame supported to swing with the quadrant and shaped and located so that its mid section envelops to an adjustable depth a cutter mounted on a tool arbor. Front and rear work guides are mounted on the frame and are independently adjustable with respect to the cutter face. Suitable guides are provided, and simple locating and clamping means are also arranged.

In the preferred mounting of the shaper or joiner frame to the quadrant, the frame is secured to the housing of the motor. The frame consists of a top central wall 166 interconnected with a bottom wall or base plate 167 connected by sides 168 and 170 which project to the front and the rear to form inclined work guide supports 171 and 172. The opening between walls 166 and 167 and sides 168 and 170 forms an effective passage for ejecting chips.

The work guide supports 171 and 172 extend out like wings and provide wedge surfaces 173 toward the work which have guiding grooves 174 and cooperate with wedge front and rear work guides 175 and 176 respectively. The work guides on the surfaces engaging the guide supports have tongues 177 (Figure 11) which engage into the grooves 174. The guide supports 171 and 172 are slotted at 178, and clamping screws 180 extend through the slots and thread into the work guides, making it possible to adjust parallel guiding surfaces 181 of the work guides to bring the guiding plane closer or further from the tool axis. The top of the cutter is provided with a cap guard 182 and the face of the cutter is covered by a swinging guard 183 pivoted transverse to the cutter axis at 184 on the cap guard. The front guard 183 is ordinarily sufficiently biased by gravity so that spring actuation is not usually necessary to return it to the guarding position. The shaper or joiner attachment is held in place by thumb screws 185 which pass through holes in the cap guard 182 and pass through elongated slots 186 in the top central wall 166 and slots 187 in the bottom plate 167. The thumb screws pass through threaded openings in the motor housing and secure the shaper or joiner to the motor housing. The thumb screws are suitably held against removal from the joiner by cotter pins 188 passing through openings in the thumb screws, so as to keep the assembly together when the structure is removed.

When the device is set up as a joiner, locating pin 190 is inserted in mating opening 191 of the motor housing and then the thumb screws 185 are tightened. The rear work guide 176 is adjusted until it is exactly in line with the face of the cutter 165, and is then locked by clamp screw 180. Then the front work guide 175 is adjusted to a position back of the face of a cutter by a distance equal to the depth of the desired cut, and held by clamp screw 180. Once this adjustment has been made, it can be retained notwithstanding that the joiner is removed. When the joiner attachment is restored to the motor, locating pin 190 will assure proper positioning. Front work guide 175 need only be adjusted where the depth of cut is changed.

When it is desired to use the attachment as a shaper, a cutter of the desired contour is employed as well known, the thumb screws 185 are loosened and locator pin 190 is withdrawn. The attachment is moved away from the cutter axis until the rear work guide is in line with that face of the cutter which is to make the shallowest cut and then thumb screws 185 are tightened. The front work guide is then brought into line with the rear work guide.

It will be evident that the short ends of any piece may be joined or shaped by using the cross cut guide of Figure 8, to support the side of the work piece as it is fed past the cutter.

It will also be evident that the quadrant carrying the motor and the shaper or joiner attachment may be swung to bring the cutter to an obtuse angle with respect to the left hand table top. If a work piece is fed past the cutter while clamped in this angular position, any desired angle may be cut on the edge of the work piece in relation to its side.

By moving the guards and lowering the elevator slide so that the top of the cutter is at a predetermined position above the left hand table top, and then moving the shaper frame to the position for shaping, the work piece may be fed past the cutter for rabbeting to make a ship lap joint.

Rabbeting may also be done by removing the attachment frame entirely and swinging the cutter axis so that it is horizontal and bringing it to the desired position at the left side of the right hand table. The work piece may then be fed past the cutter by using the right hand table and the rip fence 150 (as shown in Figure 2).

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a tool for wood working and the like, vertically spaced generally horizontal rails, a carriage slidably mounted on the rails, horizontally spaced guide rods on the carriage extending generally top to bottom thereof, an elevator slidably mounted on the guide rods, means for holding a selected position of the elevator, a pivot pin extending in horizontal direction from the elevator, a quadrant pivotally mounted on the pivot pin for angular movement about the axis thereof, means for clamping the quadrant in a selected angular position, and a tool motor mounted on the quadrant with its axis disposed at right angles to the pivot pin axis, said motor being bodily movable angularly about said pivot pin axis with said quadrant.

2. In a tool for wood working and the like, spaced generally horizontal rails, a carriage slidably mounted on the rails, horizontally spaced guide rods on the carriage extending generally transversely to the rails, an elevator slidably mounted on the guide rods, means for holding a selected position of the elevator, a pivot pin extending in horizontal direction from the elevator, a quadrant pivotally mounted on the pivot pin, means for clamping the quadrant in a selected position, a second pin on the quadrant extending in the same direction parallel to and in spaced relation to the pivot pin, the pins having notches, a tool motor having spaced openings receiving the pins, transversely movable dogs in the tool motor engaging into the notches on the pins and means for moving the dogs in unison into and out of engagement with the pins.

3. In a tool for wood working and the like, spaced generally horizontal rails, a carriage slidably mounted on the rails, horizontally spaced guide rods on the carriage extending generally transversely to the rails, an elevator slidably mounted on the guide rods, means for holding a selected position of the elevator, a pivot pin extending in horizontal direction from the elevator, a quadrant pivotally mounted on the pivot pin, means for clamping the quadrant in a selected position, a pair of spaced pins extending out parallel in the same direction from the quadrant and having lateral notches in line, a tool motor having openings which receive and engage the spaced pins, transverse dogs movable laterally of the pins in the tool motor and engaging in the notches in one position and means for moving the dogs in unison into and out of engagement in the notches.

4. In a tool for wood working or the like, spaced horizontal rails, a tool-mounting carriage having sliding bearings engaging one rail and at least one sliding bearing engaging the other rail, clamp means on the carriage for clamping said one bearing to the other rail and means on said carriage and being operative through said one bearing for effecting angular adjustment of the carriage about the axis of said one rail.

5. In a tool for wood working or the like, spaced rails, a carriage having spaced sliding bearings engaging one rail and a single sliding bearing engaging the other rail at a position intermediate between the spaced sliding bearings, a split sleeve surrounding the other rail within the carriage, a set screw acting from the carriage against the split sleeve for adjusting the position of the split sleeve with respect to the carriage and thus adjusting the position of the carriage, a clamping screw acting on the split sleeve opposite to the set screw for clamping the carriage, and means for detachably mounting a tool motor on the carriage.

6. In a wood working tool or the like, a pair of spaced generally horizontal rails, a carriage slidably moving along the rails having spaced sliding bearings on one rail and a sliding bearing on the other rail intermediate between the spaced sliding bearings on the one rail, clamping means for gripping the carriage on the other rail, horizontally spaced guide rods on the carriage extending transversely to the rails, an elevator slidable on the guide rods and having sliding bearing support on one of the guide rods operative at widely spaced points and a sliding bearing on the other guide rod intermediate between the spaced points on the one guide rod, a clamp for engaging the elevator on the other guide rod, a tool motor and means for detachably engaging the tool motor to the elevator.

7. In a wood working tool or the like, a pair of spaced generally horizontal rails, a carriage slidably moving along the rails, clamping means for gripping the carriage against one of the rails, horizontally spaced guide rods on the carriage extending transverse to the rails, an elevator slidable on the guide rods and having sliding bearing supports on one of the guide rods operative at widely spaced points and a sliding bearing on the other guide rod intermediate between the spaced points on the one guide rod and including a sleeve engaging the other guide rod, set screw means for adjusting the position of the sleeve with respect to the elevator, clamping means acting on the sleeve opposed to the set screw means to lock the elevator, a tool motor and means for detachably engaging the tool motor to the elevator.

8. In a wood working tool or the like, a pair of generally horizontal parallel spaced rails, a carriage slidably moving along the rails having spaced sliding bearings on one rail and a sliding bearing on the other rail intermediate between the spaced sliding bearings on the one rail, clamping means for gripping the carriage on the other rail, horizontally spaced guide rods on the carriage extending transversely to the rails, an elevator slidable on the guide rods and having sliding bearing support on one of the guide rods operative at widely spaced points and a sliding bearing on the other guide rod intermediate between the spaced points on one guide rod, a clamp for engaging the elevator on the other guide rod, a pivot on the elevator extending in a direction transverse to the direction of both the rails and the guide rods, a quadrant pivotally mounted on the elevator pivot and swingable about the elevator pivot, a tool motor, and quick detachable means for connecting the tool motor with the quadrant in a fixed but adjustable position, the tool motor having an axis which in normal position is parallel to the axis of the rails.

9. In a wood working tool or the like, a pair of spaced generally horizontal rails, a carriage slidably moving along the rails having spaced sliding bearings on one rail and a sliding bearing on the other rail intermediate between the spaced sliding bearings on the one rail, clamping means for gripping the carriage on the other rail, horizontally spaced guide rods on the carriage extending transversely to the rails, an elevator slidable on the guide rods and having sliding bearing support on one of the guide rods operative at widely spaced points and a sliding bearing on the other guide rod intermediate between the spaced points on the one guide rod, a clamp for engaging the elevator on the other guide rod, a horizontal-axised pivot on the elevator, a quadrant swinging on the pivot and having an arcuate slot, an abutment on the elevator extending into the arcuate slot on the quadrant, adjustable stops on the quadrant extending into the arcuate slot to engage the abutment at opposite limiting positions, a tool motor and quick detachable means for connecting the tool motor to the quadrant.

10. In a wood working tool or the like, a pair of spaced generally horizontal rails, a carriage slidably moving on the rails, spaced sliding bearings on the carriage engaging one rail, a sliding bearing on the carriage engaging the other rail intermediate between the spaced sliding bearings on the one rail, clamping means for gripping the carriage on the other rail, horizontally spaced guide rods on the carriage extending transversely to the rails, an elevator slidable on the guide rods and having a sliding bearing operative at spaced points on one of the guide rods and a sliding bearing on the other guide rod intermediate between the spaced points on the one guide rod, a clamp for engaging the elevator on the other guide rod, a horizontal-axised pivot on the elevator, a quadrant swinging on the pivot and having an arcuate slot, an abutment on the elevator extending into the arcuate slot on the quadrant, adjustable stops on the quadrant extending into the arcuate slot to engage the abutment at opposite limiting positions, a tool motor and quick detachable means for connecting the tool motor to the quadrant.

11. In a wood working tool or the like, a pair of spaced generally horizontal rails, a carriage slidably movable on the rails, spaced sliding bearings on the carriage engaging one rail, a sliding bearing on the carriage engaging the other rail intermediate between the spaced sliding bearings on the one rail, clamping means for gripping the carriage on the other rail, horizontally spaced guide rods on the carriage extending transversely to the rails, an elevator slidable on the guide rods and having a sliding bearing operative at spaced points on one of the guide rods and a sliding bearing on the other guide rod intermediate between the spaced points on the guide rod including a sleeve adjustable with respect to the elevator and engaging the other guide rod, set screw means for adjusting the sleeve with respect to the elevator, clamping means acting on the sleeve opposed to the set screw means for clamping the elevator on the other guide rod, a horizontal-axised pivot on the elevator, a quadrant swinging on the pivot and having an arcuate slot, an abutment on the elevator extending into the arcuate slot on the quadrant, adjustable stops on the quadrant extending into the arcuate slot to engage the abutment in opposing limiting positions, a tool motor and quick detachable means for connecting the tool motor to the quadrant.

12. In a wood working tool or the like, horizontally spaced rails, a pair of separate tables mounted to slide relatively to one another along the rails and having their tops in a common fixed plane, means pivotally connecting said tables to one of said rails for swinging movement about the axis thereof whereby said tables may be raised out of engagement with and lowered on to the other rail means for clamping the tables in desired lowered positions, a tool holder and means for clamping the tool holder at a position intermediate between the tables.

References Cited in the file of this patent

UNITED STATES PATENTS

| | | | |
|---|---|---|---|
| Re. 4,763 | Grosvenor | | Feb. 20, 1872 |
| 28,005 | Morton | | Apr. 24, 1860 |
| 244,335 | Strifler | | July 12, 1881 |
| 937,240 | Haldeman | | Oct. 19, 1909 |
| 944,489 | Linderman | | Dec. 28, 1909 |
| 1,099,588 | Coates | | June 9, 1914 |
| 1,180,842 | Goetz | | Apr. 25, 1916 |
| 1,207,683 | Coyle | | Dec. 5, 1916 |
| 1,593,317 | Thomas | | July 20, 1926 |
| 1,638,086 | Carter | | Aug. 9, 1927 |
| 1,703,179 | Skolnik | | Feb. 26, 1929 |
| 1,707,764 | Mattison | | Apr. 2, 1929 |
| 1,720,535 | Wold | | July 9, 1929 |
| 1,800,521 | Girrbach | | Apr. 14, 1931 |
| 1,820,162 | Salvat | | Aug. 25, 1931 |
| 1,846,641 | Hedgpeth | | Feb. 23, 1932 |
| 2,013,778 | Halvorsen et al. | | Sept. 10, 1935 |
| 2,047,603 | Tremblay | | July 14, 1936 |
| 2,076,511 | Hedgpeth | | Apr. 6, 1937 |
| 2,170,687 | Johnson | | Aug. 22, 1939 |
| 2,193,359 | Haas | | Mar. 12, 1940 |
| 2,314,697 | Goff | | Mar. 23, 1943 |
| 2,323,248 | Sellmeyer | | June 29, 1943 |
| 2,506,076 | Garrison | | May 2, 1950 |